Sept. 23, 1947.   C. N. HUNTLEY ET AL   2,427,727
LEADING-IN WIRE
Filed Sept. 24, 1943
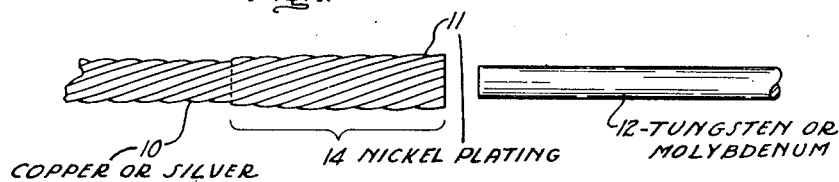
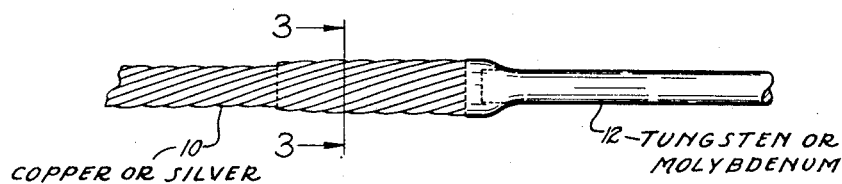
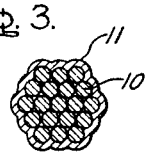
Inventors:
Charles N. Huntley,
John A. Campbell,
by John H. Anderson
Their Attorney.

Patented Sept. 23, 1947

2,427,727

UNITED STATES PATENT OFFICE 2,427,727

LEADING-IN WIRE

Charles N. Huntley, University Heights, and John A. Campbell, Willoughby, Ohio, assignors to General Electric Company, a corporation of New York Application September 24, 1943, Serial No. 503,616

1 Claim. (Cl. 174—94)

Our invention relates to leading-in wires for conducting electrical currents through the envelopes of electric lamps, discharge tubes and other hermetically sealed electrical devices and to a method of making the leading-in wires. More particularly, our invention relates to a leading-in wire comprised of two butt welded lengths of wire of different and dissimilar metals not readily joined together, and to a method of welding such lengths of wire into strong unitary wire.

Leading-in wires for sealed electrical devices must usually be formed of two or more lengths of wire which are butt welded together in end-to-end relation in order that they shall have the desired properties at various points along their length. The lengths of wire are usually joined together by electro-percussive methods wherein an electrical discharge takes place while their ends are pressed against each other. The weld must be of satisfactory electrical conductivity, strength, and flexure resistance to function properly in the electrical device.

The formation of the welds is, in some instances, very difficult since the composition of the wire lengths is often such that they have very dissimilar properties and do not weld readily together. Such conditions exist when one length of the leading-in wire is made of copper or silver and the length of wire to be welded thereto is either tungsten or molybdenum. The difficulties are usually corrected by introducing an alloying or brazing material into the weld. Nickel is a satisfactory alloying and brazing material and has been employed in the form of a sleeve or reinforcement clamped around the end of the more flexible length of wire. The end portion of the sleeve in such instances flows into the weld and around the end of the other length of wire during the welding operation. Generally, the flexible wire consists of a cable made of several strands of copper wire, and the sleeve reinforcement functions both to hold the strands in place before the weld is made and to keep the bending strains from the vicinity of the end of wire after the weld is made.

One object of our invention is to provide a welded leading-in wire having an alloying and fluxing material joining the different portions thereof and having a reinforcement adjacent the weld which leading-in wire is more easily made and requires less equipment to manufacture commercially in the various sizes and large quantities required.

Another object of our invention is to provide a method of joining together the lengths of wire of dissimilar materials, which method requires the use of an alloying and brazing material to effectively join them together.

Other objects and advantages of our invention will appear from the following description of our preferred method of making one of the leading-in wires of our invention.

In the drawing, Fig. 1 is a side elevation on an enlarged scale of the end portions of two wires to be welded together according to our invention; Fig. 2 is a corresponding view of the ends of the wires after being welded together; and Fig. 3 is a section through the end of the more readily fusible wire along line 3—3 of Fig. 2.

According to our invention, the end of the more readily fusible wire 10, as shown in the drawing, is first coated with the alloying and brazing material 11 and is then butt welded to the end of the less readily fusible wire 12 in the usual electro-percussive manner. In the instance disclosed, the more readily fusible wire 10 takes the form of a cable of tightly twisted strands of copper wire, the alloying and brazing material 11 is nickel, and the less fusible wire 12 is tungsten.

The alloying and brazing material 11 is preferably electroplated about the end of the wire 10 which is immersed in the plating solution sufficiently to cause a portion 14 of the wire 10 extending an appreciable distance back from the end thereof to be coated. This manner of applying the alloying and brazing material 11 to the wire 10 is particularly advantageous in that said material covers the entire end of the wire and enters between the strands somewhat so as to form a concentration at the end of wire 10 to be welded. Sufficient alloying and brazing material 11 is therefore provided to flow about the end of the less fusible wire 12 and the end portions of the strands of wire 10, which are also melted down somewhat during the welding operation, to form a strong clean weld. The remaining alloying and brazing material 11 on the portion of the wire 10 adjacent the weld stiffens and reinforces it so that it will not be bent or strained directly adjacent the weld. Until the weld is made the alloying and brazing material 11 also functions as a means of holding the strands of the wire in place. The electro-deposited nickel plating forming the alloying and brazing material, as shown in Fig. 3, deposits only on the outer surface of the plated area 14 of the wire 10 generally and takes the irregular form thereof. Such deposits are relatively thin and in the case of copper wire of nineteen strands having a total thickness of .049 inch, sufficient nickel is deposited when the total thickness has increased to .060 inch. A plating period of 20 minutes at a voltage of from 2 to 5 volts is sufficient to provide the required deposit in most instances.

In certain instances it is desirable to have the wire 10 receive an annealing operation in the course of its formation into a leading-in wire in order to increase its flexibility. This annealing operation usually consists in heating the wire to 800° C. for thirty minutes in an inert hydrogen atmosphere when the wire 10 is made of copper. It is preferred that this operation or a corresponding heating operation follow the plating of the wire 10 to cause the plating solution captured between the strands, etc., to be driven off.

All the equipment used in both the plating and heating steps in the formation of the leading-in wire of our invention is adapted to be used with all sizes of wires used, and a considerable saving over previous methods of operation, wherein various materials, dies and other apparatus were required, is realized.

What we claim as new and desire to secure by Letters Patent of the United States is:

A lead-in wire comprising a flexible stranded conductor of metal selected from the group consisting of copper and silver and a solid conductor of metal selected from the group consisting of tungsten and molybdenum, a substantial length of one end of the individual strands of the first-named conductor each having thereon a substantially uniform plating of nickel whereby the said end of the conductor is rendered rigid and the individual strands are bonded together solely by said plating, the plated end of the said stranded conductor being butt-welded to an end of the solid conductor with a quantity of the nickel metal fused to and around the adjacent ends of both conductors.

CHARLES N. HUNTLEY.
JOHN A. CAMPBELL.

REFERENCES CITED

The following references are of record in the file of this patent:

UNITED STATES PATENTS

| Number | Name | Date |
|---|---|---|
| 2,005,256 | Eitel et al. | June 18, 1935 |
| 1,575,994 | Laise | Mar. 9, 1926 |
| 1,745,180 | Mischler | Jan. 28, 1930 |
| 1,387,426 | Merritt | Aug. 9, 1921 |
| 1,908,859 | O'Neill | May 16, 1933 |

FOREIGN PATENTS

| Number | Country | Date |
|---|---|---|
| 234,374 | Great Britain | May 28, 1925 |